United States Patent [19]

Imbert et al.

[11] Patent Number: 5,192,997
[45] Date of Patent: Mar. 9, 1993

[54] AUTOMATIC METHOD FOR IDENTIFYING A COLOR TV STANDARD

[75] Inventors: Michel Imbert, Seyssins; Frédéric Lambert, Grenoble, both of France

[73] Assignee: SGS-Thomson Microelectronics S.A., Gentilly, France

[21] Appl. No.: 650,567

[22] Filed: Feb. 5, 1991

[30] Foreign Application Priority Data

Feb. 6, 1990 [FR] France .................... 90 01623

[51] Int. Cl.⁵ ................................ H04N 3/27
[52] U.S. Cl. ......................... 358/21 R; 358/11
[58] Field of Search ............... 358/21 R, 23, 11

[56] References Cited

U.S. PATENT DOCUMENTS 4,688,082 8/1987 Kato .
5,119,177 6/1992 Lim .................. 358/21 R

FOREIGN PATENT DOCUMENTS 0162443 5/1985 European Pat. Off. .

OTHER PUBLICATIONS

8028 Electronic Components & Applications, "Single-- Chip Multi-Standard Colour Decoder", Smaal, vol. 7, No. 1, 1985.

Primary Examiner—James J. Groody
Assistant Examiner—David E. Harvey
Attorney, Agent, or Firm—Lowe, Price, LeBlanc & Becker

[57] ABSTRACT

A method for automatically identifying the PAL or NTSC color TV standard comprises the following steps: providing a first demodulation signal (IC1) with the regenerated 90°-phased sub-carrier; providing a second demodulation signal at the reference frequency of one of the colors (FOR) of the SECAM standard; providing a first voltage (VC1) by integrating the first demodulation signal (IC1), and providing a first associated logic criterion (C1), simultaneously applying the first signal (IC1) at the input of an inverter switched according to the rate of a non-half line-frequency phased signal (FL/2), providing a second voltage (VC2) by integrating the output signal (ICC) of the inverter (31), and providing a second associated logic criterion (C2); similarly providing, but from the second demodulation signal (IC2), the first logic criterion (C1) and the second logic criterion (C2); and identifying the standard received as a function of the state of the first and second logic criteria (C1 and C2).

3 Claims, 6 Drawing Sheets

| SWITCH POSITION | A | A | B |
|---|---|---|---|
| SELECTED AND TRANSMITTED STANDARD / CRITERIONS | PAL | NTSC | SECAM |
| C1 | 0 | 0 | 1 |
| C2 | 1 | 0 | 1 |
| C3 | 1 | 1 | 1 |

Figure 8

AUTOMATIC METHOD FOR IDENTIFYING A COLOR TV STANDARD

BACKGROUND OF THE INVENTION

The present invention relates to the field of color TV sets and more particularly to chrominance decoding circuits in a color TV set liable to receive several standards.

In order to decode a video signal and restore a color image, a color TV set has to identify the color TV standard used at the emission. Conventional color TV sets are equipped with a system for automatically identifying the norm or standard of the color TV set used for the emission. The invention more particularly relates to an automatic method for identifying a color TV standard in a multistandard TV set.

Presently, the most commonly used color TV standards are PAL, NTSC and SECAM standards. For these three standards, each line of the composite video signal comprises a synchronization pulse, a burst of a few oscillations of the chrominance sub-carrier signal, then the signal itself corresponding to the image, comprising superimposed luminance and chrominance information, the latter information being carried by the luminance signal.

The characteristics of the chrominance sub-carrier in the various PAL, NTSC and SECAM standards are defined in the published documents concerning these standards and will not be described in detail here. However, the main characteristics of these various standards will be briefly reminded because these indications are useful for a better understanding of the invention.

In the PAL standard, the frequency of the chrominance sub-carrier is equal for all the lines, but the phase of one of the modulation vectors varies + or −90° from one line to another. The frequency of the chrominance sub-carrier is standardized at 4.43 Mhz. In this system, the burst signal is also shifted by + or −90° from one line to the next.

In the NTSC stndard, the chrominance sub-carrier is equal for all the lines.

In the SECAM standard, one uses two chrominance sub-carrier frequencies which alternate from one line to another, at 4.25 Mhz and 4.40 Mhz, respectively. These two chrominance sub-carriers are frequency modulated.

The multistandard color TV sets must have distinct internal systems designed to decode the luminance and chrominance signals for each standard used.

Therefore, these TV sets have to previously identify the received standard.

Systems for automatically identifying the standard used already exist. Generally, for such an automatic standard identification, the systems known use the bursts of the chrominance sub-carrier signal that are present at the beginning of each line. In fact, these bursts are standardized and calibrated samples of the chrominance sub-carrier transmitted on the video signal and comprise all the characteristic information concerning the transmitted color standard. The information contained in these bursts represents the frequency, the phase of one of the modulation vectors and the frequency or phase variation of one line with repect to the next one.

Due to the fact that the frequency or the phase of one of the modulation vectors of the chrominance sub-carrier varies from on line to the next, the method used for identifying the standard is complicated.

Up to now, in order to obtain a proper standard identification, it was necessary to previously "phase" a half line-frequency signal with respect to the video signal. Such a "phasing" operation is carried out simultaneously with the standard identification, in most systems known nowadays. Indeed, for a reliable identification, the conventional identification systems of standards require a "phasing" of the half line-frequency signal and, at the same time "phasing" systems can only operate if the standard has been previously identified. This difficulty is conventionally overcome by carrying out successive identification tests for each possible standard and, for each of these successive tests, successive "phasing" tests are made for each possible standard. In this case, it is a so-called "loop" identification, with the "phasing" operation of the half line-frequency signal.

Loop identification can malfunction, especially on poor quality signals.

Therefore, an object of the invention is to provide an "unlooped" automatic identification method, that is, an identification of standards that does not require a previous or simultaneous "phasing" of the half line-frequency signal.

SUMMARY OF THE INVENTION

Thus, the invention relates to a method for automatically identifying the PAL or NTSC color TV standard comprising the steps of demodulating the chrominance signal bursts with the regenerated sub-carrier, 90°-phased with respect to said bursts, for providing a first demodulation signal; demodulating the chrominance signal bursts with a signal at the reference frequency of one of the SECAM standard colors, for providing a second demodulation signal; providing a first voltage by integrating in time the first demodulation signal, comparing this first voltage with a first predetermined threshold and providing a first logic criterion at a first logic state if the first voltage is lower than the first threshold and at the other logic state otherwise, simultaneously applying the first demodulation signal to the input of a polarity inverter switched at the rate of a non-half line-frequency phased signal, providing a second voltage by integrating in time the output signal of the polarity inverter, comparing the absolute value of the second voltage with a second predetermined threshold and providing a second logic criterion at the first logic state if the absolute value of the second voltage is lower than the second threshold and at the other logic state otherwise; similarly providing, but from the second demodulation signal, the first logic criterion and the second logic criterion; and identifying the standard received as being the PAL standard if, from the first demodulation signal, the first and second logic criteria are at the first and the other logic state, respectively, identifying the received standard as being the NTSC standard if, from the first demodulation signal, the first and second logic criteria are both at the first logic state and identifying the received standard as being the SECAM standard if, from the second demodulation signal, the first and second logic criteria are both at the other logic state.

According to an aspect of the invention, this method further comprises the steps of demodulating the chrominance signal bursts with the regenerated 0°-phased sub-carrier for providing a third demodulation signal; demodulating the chrominance signal bursts with a signal at the reference frequency of the other SECAM color standard, for providing a fourth demodulation signal; providing from the third demodulation signal a third voltage resulting from the integration in time of the third demodulation signal, comparing this third voltage with a third predetermined threshold and providing a third logic criterion at the first logic state if the third voltage is lower than the third threshold and the other state otherwise; similarly providing, but from the fourth demodulation signal, the third logic criterion; and identifying the standard received as being the PAL or NTSC standard if, from the third demodulation signal, the third logic criterion is at the other logic state and identifying the standard received as being the SECAM standard if, from the fourth demodulation signal, the third logic criterion is at the other logic state.

This method can also comprise the steps of, firstly, providing the three logic criteria from the first and third demodulation signals, identifying the standard received as being the PAL standard if the first, second and third logic criteria are respectively at the first logic state, the other logic state and the other logic state and identifying the standard received as being the NTSC standard if the first, second and third logic criteria are respectively at the first logic state, the first logic state and the other logic state; and, secondly, providing the three logic criteria from the second and fourth demodulation signals and identifying the standard received as being the SECAM standard if the first, second and third logic criteria are all at the other logic state.

BRIEF DESCRIPTION OF THE DRAWINGS

The foregoing and other objects, features and advantages of the invention will be apparent from the following detailed description of a preferred embodiment as illustated in the accompanying figures wherein:

FIG. 8 is a table representing the logic state of the various signals as a function of the standard received, according to the method of the invention.

DETAILED DESCRIPTION OF THE INVENTION

Figure 1:
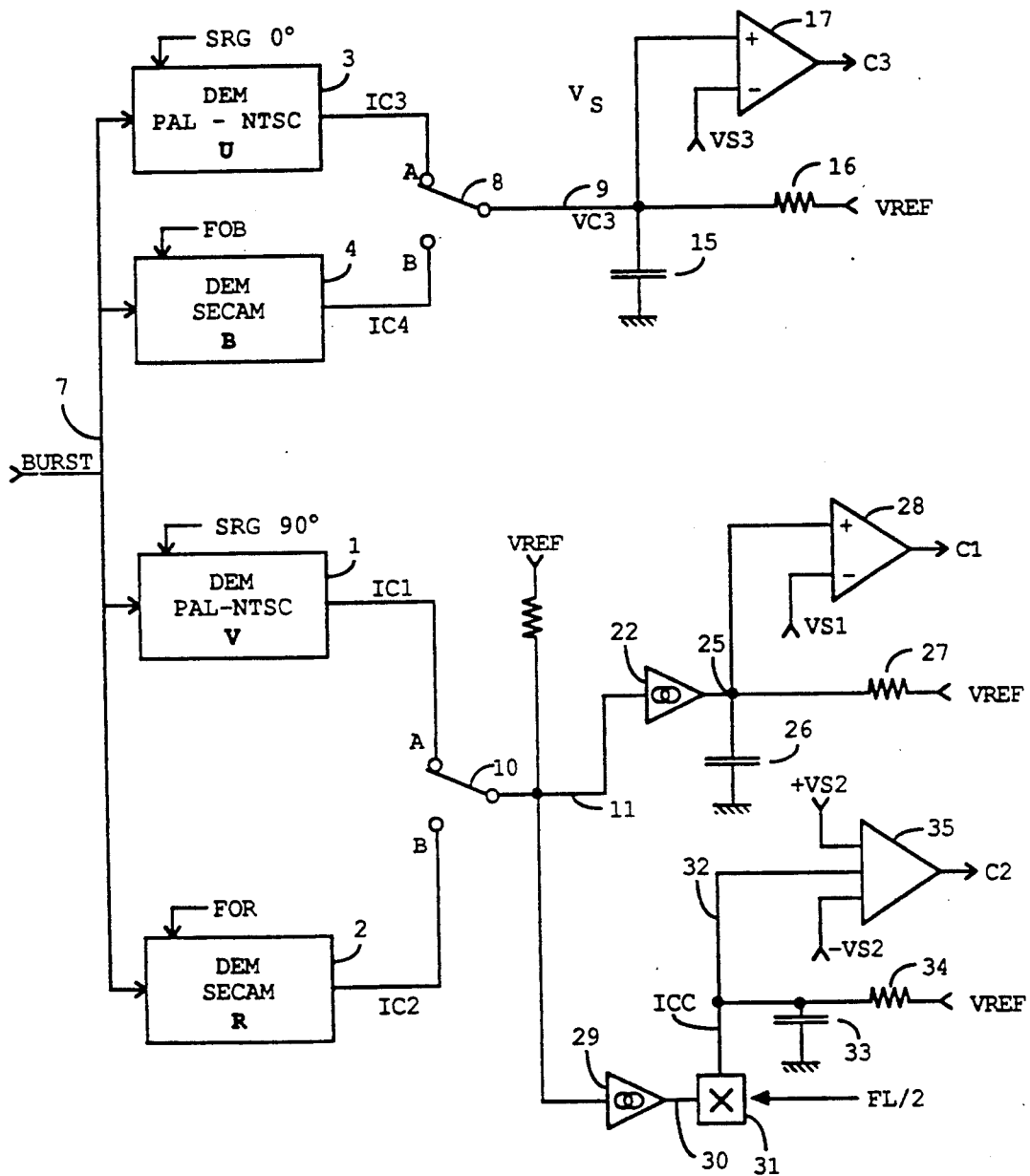
FIG. 1 schematically shows a first portion of the device implementing the method according to the invention.

FIG. 1 shows an electronic circuit comprised in the device for identifying a standard according to the invention. This identification circuit is generally placed inside the color TV set. Four demodulators labelled 1-4 can be seen, simultaneously receiving at input 7 a signal constituted by the successive bursts (BURST) of the chrominance signal, these bursts being previously extracted from the composite video signal provided in the color TV set.

The identification method of a standard according to the invention successively identifies whether the received signal is of the PAL, NTSC or SECAM standard. The demodulator 1, used for identifying the PAL or NTSC standard, receives at its second input a signal corresponding to the regenerated sub-carrier (SRG), 90°-phased with respect to the BURST modulation axis in NTSC standard. In order to generate this signal, means (not shown) are used for providing the regenerated 90°-phased sub-carrier, for example through a phase-lock circuit. Demodulator 1 outputs a signal IC1 which can be sent on a line 11 through a switch 10. The signal on line 11 passes through a current amplifier 22, the output of which is connected to a line 25. Line 25 is connected to ground through a capacitor 26 and to a reference voltage VREF through a resistor 27. Thus, signal VC1 sent on line 25 corresponds to an integration in time of the signal on line 11. Voltage VC1 is compared with a predetermined threshold voltage VS1 through a comparator 28 outputing a first logic signal, further called "first logic criterion" C1. The first logic criterion C1 is low when VC1 is lower than VS1 and high otherwise.

The signal on line 11 also passes through a current amplifier 29, the output 30 of which is connected to the input of a polarity inverter 31 controlled by a half line-frequency signal FL/2 which has not been previously "phased". The polarity inverter 31 outputs a signal ICC sent on a line 32. Line 32 is connected to ground through a capacitor 33 and to a reference voltage through a resistor 34; hence, a voltage VC2 resulting from integration in time of signal ICC is established on line 32. A 3-inputs comparator 35 compares the value of voltage VC2 with two predetermined threshold voltages +VS2, −VS2. This comparator outputs a second logic signal, further called "second logic criterion" C2. This logic criterion C2 is low if VC2 is lower than +VS2 or higher than −VS2 and high otherwise.

Considering the unit formed by demodulator 1 and the associated circuits that have been described, how the PAL or NTSC standard is identified when it is received will now be explained. For this, see FIGS. 2 and 3, successively.

Figure 2:
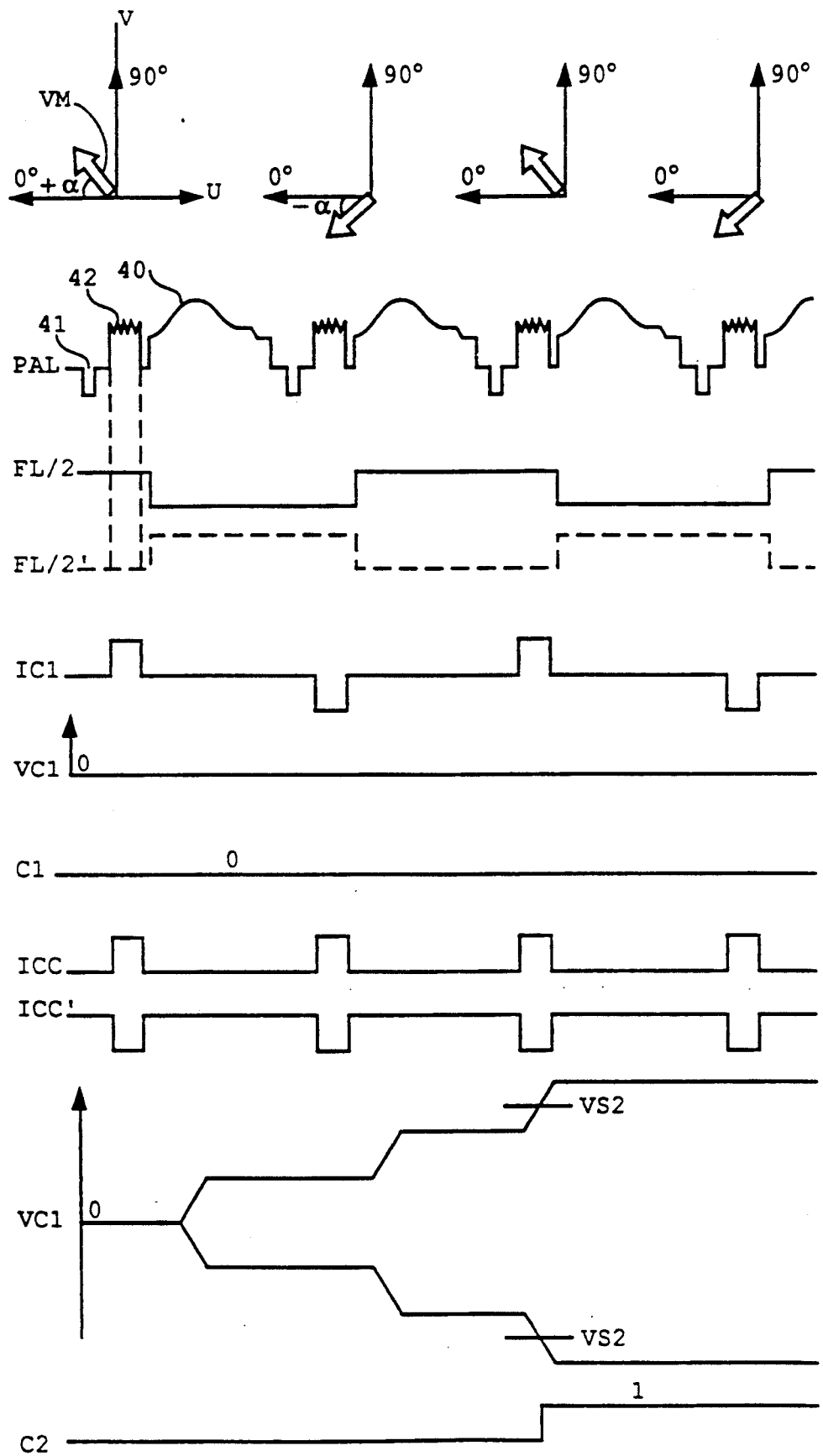
FIGS. 2-7 are diagrams showing the evolution of the various signals present in a device implementing the method according to the invention, for each standard liable to be received.

FIG. 2 very schematically shows the structure of the composite video signal corresponding to the PAL standard, for three successive lines. The composite video signal 40 comprises, in the line retrace interval, a synchronization pulse 41 followed by a burst identifying the chrominance signal 42. The demodulation signal IC1 provided by demodulator 1 goes alternatively positive and negative during each successive burst. In fact, the identification vector VM, in PAL standard (shown on top of each burst 42) has a + and −t phase, successively, from one line to another, and its projectin on axis V at 90° then gives positive and negative signals, successively. Therefore, voltage VC1 representing the integration of signal IC1 stays null and the logic state of the first logic criterion stays low. Furthermore, the output signal ICC of the polarity inverter 31 goes positve during each burst for a given phase of the half line-frequency signal FL/2 and goes negative (ICC') during each burst for a half line-frequency signal FL/2' of opposite phase. Since comparator 35 compares the value of voltage VC2 with respect to thresholds VS2, VS3, it can be seen that the second logic criterion C2, goes high whatever the half line-frequency signal "phase" is.

Figure 3:
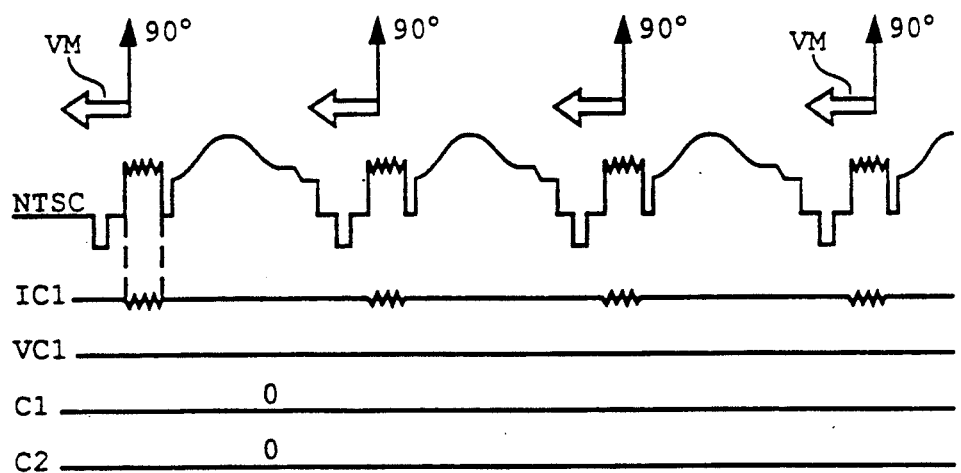

If the received signal is of the NTSC standard, the demodulation signal IC1 provided by demodulator 1 is null during each burst, as can be seen in FIG. 3. Indeed, the identification vector VM, in NTSC standard, always has a 0° phase, for all lines, and its demodulation with a 90° phase signal therefore provides a null signal (projection of vector VM on axis V). Of course, the two logic criteria C1 and C2 are low, independently on the "phase" of the half line-frequency signal FL/2.

Hence, criteria C1 and C2 are at defined states in case of reception of PAL or NTSC signals and will always be at these states in the presence of these signals. The latter will be reminded in the table of FIG. 8.

Figure 4:
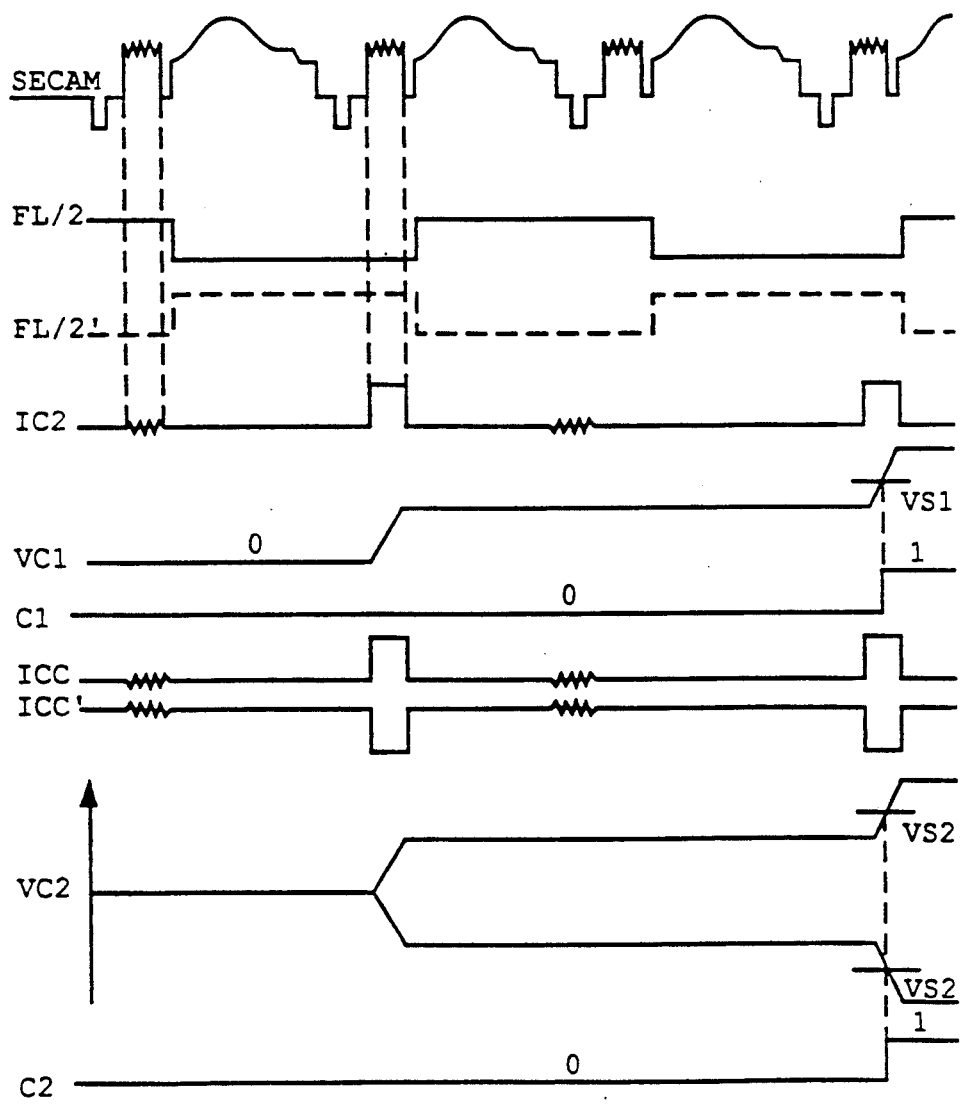

The circuit providing the first and second logic criteria C1 and C2 can also be connected to a SECAM demodulator 2, the second input of which receives a signal corresponding to the red reference frequency FOR of the SECAM standard. FIG. 4 corresponds to the case when the demodulation signal IC2 output from demodulator 2 is sent to line 11. This demodulation signal IC2 goes positive every two bursts, the first logic criterion C1 then goes high. For a given "phase" of the half line-frequency signal FL/2, signal ICC goes positive every two bursts and, for a half line-frequency signal FL/2' of opposite phase, the resulting signal ICC' goes negative every two bursts. In both cases, the second logic criterion C2 is high.

In order to make the difference between PAL/NTSC and SECAM standards, it is also possible to use demodulators 3 and 4. The second input of demodulator 3 receives the signal from the regenerated 0°-phased subcarrier (SRG), and the second input of demodulator 4 receives a signal corresponding to the blue reference frequency FOB in the SECAM standard. Demodulator 3 output a demodulation signal IC3 and demodulator 4 a demodulation signal IC4. Switch 8 couples the outputs of demodulators 3 or 4, respectively, to a line 9. Line 9 is connected to ground through a capacitor 10 and to a reference voltage VREF through a resistor 11. Therefore, the voltage VC3 which is established on line 9 corresponds to an integration in time of the demodulation signal sent on this line. Voltage VC3 is compared with a predetermined threshold voltage VS3 through a comparator 12, the output of which provides a third logic criterion C3.

Figure 5:
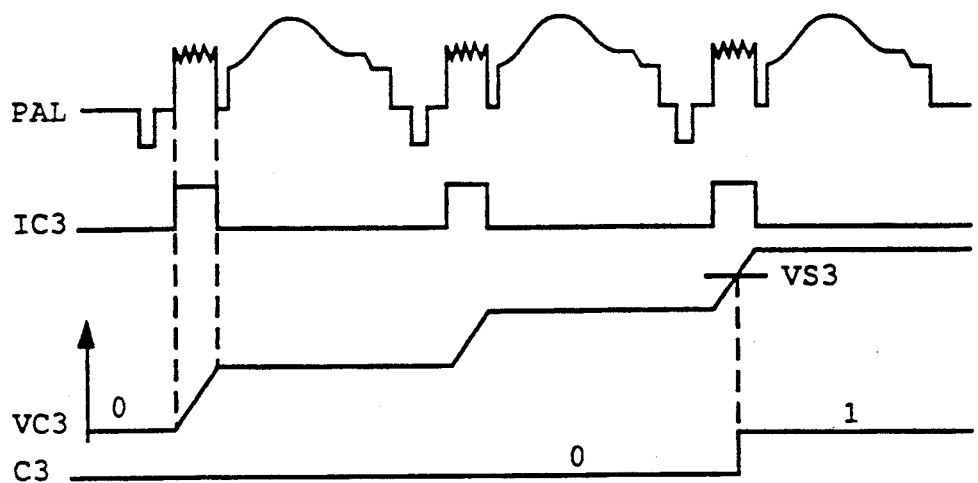
Figure 6:
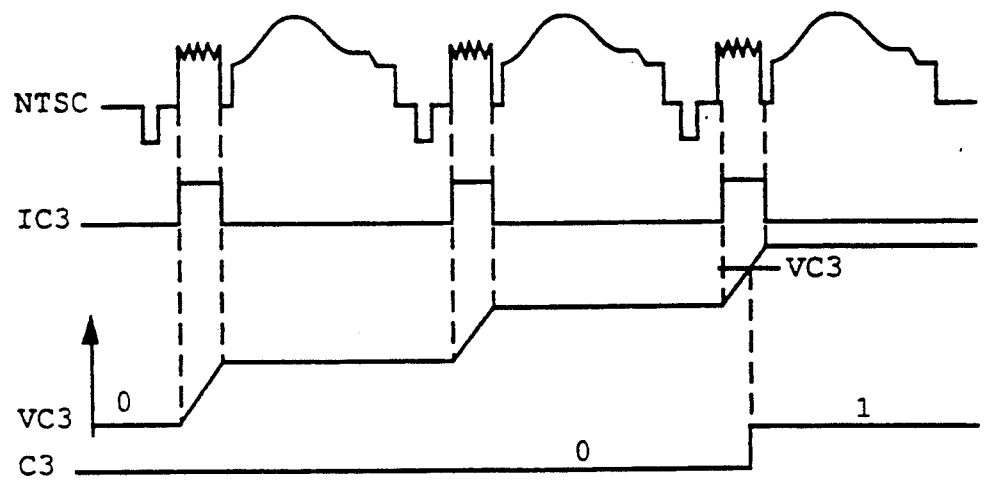

This circuit determines whether the signal received by the TV set is in SECAM, PAL or NTSC standard type by demodulating the sub-carrier with a signal having the same frequency. However, using the regenerated 0°-phased sub-carrier signal does not allow to differentiate the PAL and NTSC standards. As can be seen in FIG. 5, if the received signal is in PAL standard, the demodulation signal IC3 at the output of demodulator 3 goes positive at each burst. Therefore, the third logic criterion C3 goes high. The same thing occurs if the received signal is in NTSC standard, as can be seen in FIG. 6. Indeed, in PAL standard, one of the modulation vectors varies + or −90° from one line to the next, whereas it remains identical in NTSC standard. Hence, the projection of this modulation vector on axis U corresponding to the 0° phase always keeps the same sign, from one line to another, either in PAL standard on in NTSC standard. Thus, the same demodulator 3 can be used. It can be seen in FIG. 5 that, when the received signal is in PAL standard, the demodulation signal IC3 goes positive during each burst, and, therefore, the third logic criterion C3 goes high. FIG. 6 shows that, when the signal received is in NTSC standard, the demodulation signal IC3 similarly goes positive during each burst and, therefore, the third logic criterion C3 goes high. If demodulator 4 is connected, and if the signal received is in SECAM standard, it can be seen that the demodulation signal IC4 at the output of demodulator 4 goes positive every two lines and, hence, the third logic criterion C3 goes high.

It has been seen above that demodulator 1 identifies the NTSC standard by the criteria C1 and C2 going low, which in fact correspond to an absence of signal IC1. This identificaion is not reliable because it may also correspond to a quite different standard, an insufficient signal or to any other failure. Thus, identification of the NTSC standard has to be confirmed by demodulator 1.

Figure 7:
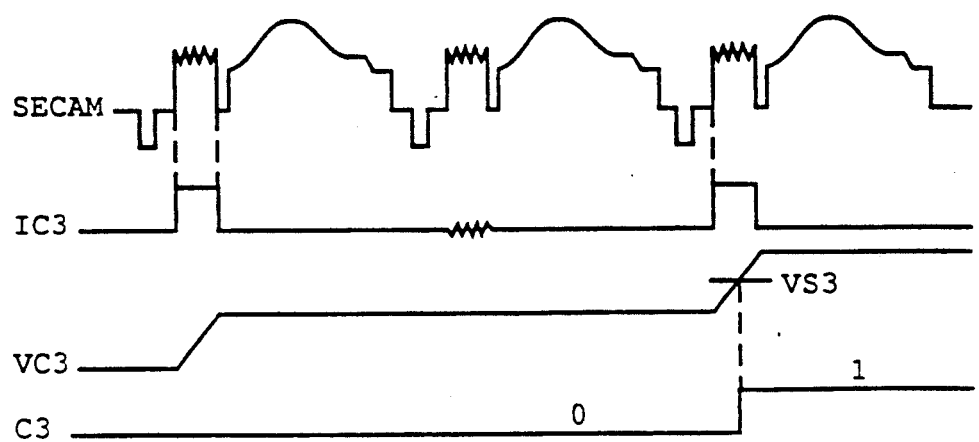

It has been seen above that demodulator 2 identifies the SECAM standard through the logic criterion C3. Demodulator 4 confirms the identification of the SECAM standard, as shown in FIG. 7.

The overall circuit operates as follows. At a first step, switches 8 and 10 are simultaneously at state A to connect demodulators 3 and 1. At a second step, switches 8 and 10 are at a state B to connect demodulators 4 and 2. For each of these two steps, the logic states of the logic criteria C1, C2 and C3 are detected. The table in FIG. 8 groups the simultaneous logic states of the logic criteria C1, C2 and C3 as a function of the standard received. If, in a first step corresponding to position A of the two switches, the logic criteria C1, C2 anc C3 are low, high and high, respectively, the standard received is PAL. If the logic criteria C1, C2 and C3 are low, low and high, respectively, the standard received is NTSC; and if, in a second step corresponding to the position B of the switches, the logic criteria C1, C2 and C3 are all high, the standard received is SECAM.

Figure 9:
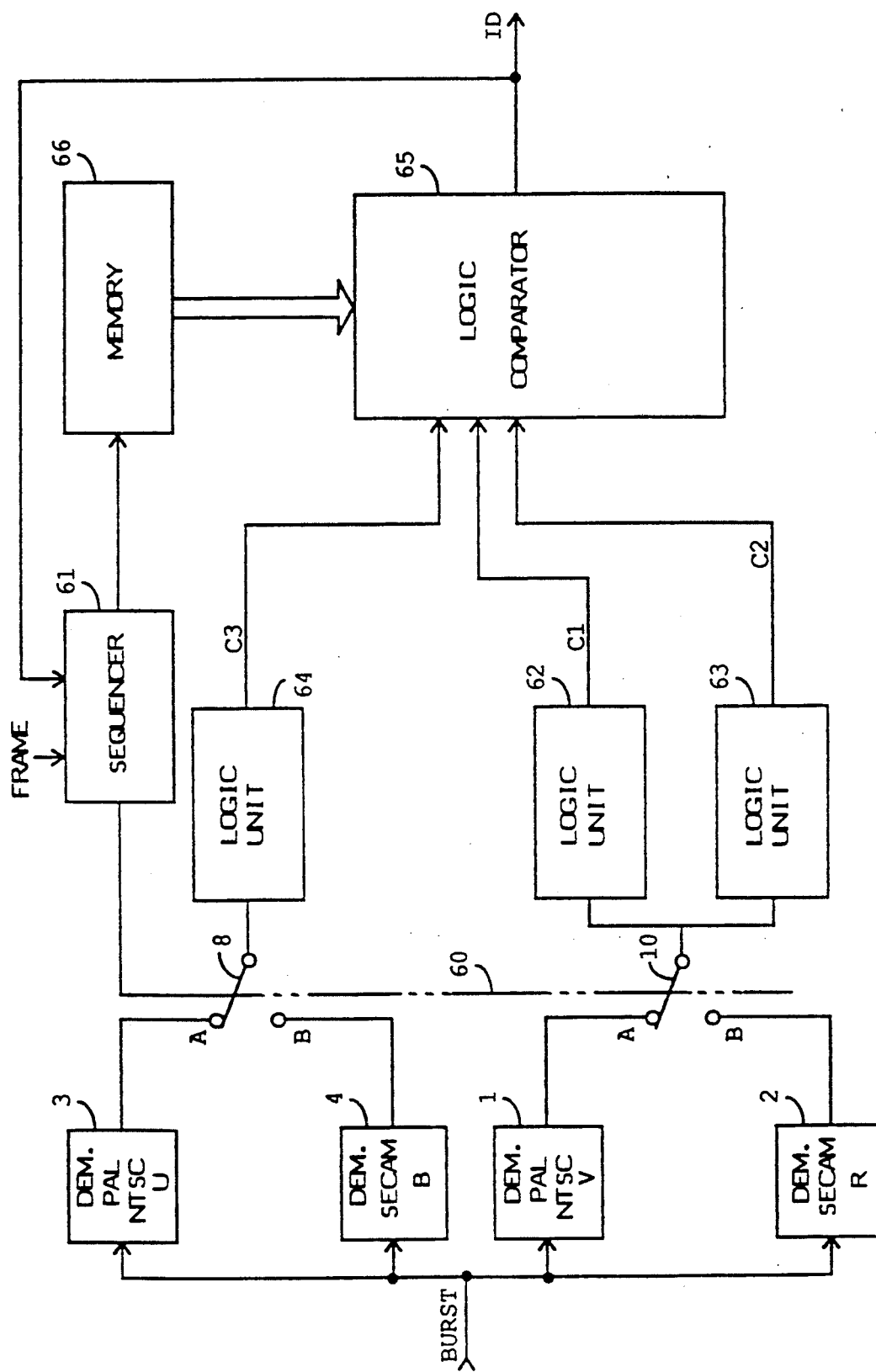
FIG. 9 schematically shows the overall device implementing the method according to the invention.

FIG. 9 shows a general arrangement of a device implementing the method according to the invention. It shows in a simplified way, the four demodulators 1–4, the two switches 8 and 10 controlled by a device for simultaneous switching (schematically represented by a dot-and-dash line 60), driven by a sequencer 61. The electronic unit 62 provides the first logic criterion C1, unit 63 the second logic criterion C2 and unit 64 the third logic criterion C3. The logic signals corresponding to logic criteria C1, C2 and C3 are sent to a logic comparison circuit 65. Circuit 65 compares all the logic criteria C1, C2, C3 which simultaneously reach it, as a function of the simultaneous position A or B of switches 8 and 10, with the logic criteria corresponding to one of the three possible standards permanently stored in a memory 66. Sequencer 61 receives a frame synchronization signal for controlling, at the beginning of an image, the various means constituting this device, particularly the simultaneously actuated switches 8 and 10, the logic comparator 65 and memory 66. Logic comparator 65 outputs a signal ID for identifying one out of the three standards liable to be received by the color TV set.

The delay necessary for identifying one standard out of the three PAL, NTSC and SECAM standards is relatively short. In fact, the switches only have to be successively switched to the two states A, B while remaining in each of these states during approximately a delay necessary for a frame to pass. Therefore, the maximum identification time corresponds to about three frames.

If the three logic criteria C1, C2 and C3 are used in such a way, the identification of the three PAL, NTSC and SECAM standars is obtained in all cases through two different paths, corresponding to two different demodulators, which allows a very reliable identification, without any prior "phasing" of the half line-frequency signal.

We claim:

1. A method for automatically identifying the PAL or NTSC color TV standard comprising the following steps:

demodulating the chrominance signal bursts with the regenerated sub-carrier, 90'-phased with respect to said bursts, for providing a first demodulation signal;

demodulating the chrominance signal bursts with a signal at the reference frequency of one of the colors of the SECAM standard, for providing a second demodulation signal;

providing a first voltage by integrating in time the first demodulation signal, comparing this first voltage with a first predetermined threshold and providing a first logic criterion being at a first logic state if the first voltage is lower than the first threshold and at the other logic state otherwise; simultaneously applying the first demodulation signal to the input of a polarity inverter switched according to the rate of a non-half line-frequency phased signal, providing a second voltage by integrating in time the output signal of the polarity inverter, comparing the absolute value of the second voltage with a second predetermined threshold and providing a second logic criterion at the first logic state if the absolute value of the second voltage is lower than the second threshold and at the other logic state otherwise;

similarly providing, but from the second demodulation signal, the first logic criterion and the second logic criterion; and identifying the standard received as being the PAL standard if, from the first demodulation signal, the first and second logic criteria are at said first and the other logic state, respectively, identifying the received standard as being the NTSC standard if, from the first demodulation signal, said first and second logic criteria are both at the first logic state and identifying the received standard as being the SECAM standard if, from the second demodulation signal, said first and second logic criteria are both at the other logic state.

2. A method for automatically identifying the standard of a color TV set according to claim 1, further comprising the following steps:

demodulating the chrominance signal bursts with a gegenerated 0°-phased sub-carrier for providing a third demodulation signal;

demodulating the chrominance signal bursts with a signal at the reference frequency of the other SECAM color standard, for providing a fourth demodulation signal;

providing from said third demodulation signal a third voltage resulting from the integration in time of the third demodulation signal, comparing this third voltage with a third logic criterion at said first logic state if said third voltage is lower than the third threshold and the other state, otherwise;

similarly providing, but from the fourth demodulation signal, the third logic criterion; and identifying the standard received as being the PAL or NTSC standard if, from said third demodulation signal, the third logic criterion is at the other logic state and identifying the standard received as being the SECAM standard if, from the fourth demodulation signal, the third logic criterion is at the other logic state.

3. A method for atuomatically identifying the standard of a color TV set according to claim 1, comprising the following steps:

firstly, providing said three logic criteria from said first and third demodulation signals, identifying the standard received as being the PAL standard if the first, second and third logic criteria are respectively at said first logic state and identifying the standard received as being the NTSC standard if said first, second and third logic criteria are respectively at said first logic state, said first logic state and said other logic state; and, secondly, providing said three logic criteria from the second and fourth demodulation signals and identifying the standard received as being the SECAM standard if the first, second and third logic criteria are all at logic state.

* * * * *